(No Model.)
J. P. THOMAS.
BALL BEARING.
No. 596,310.　　　　　　　　　Patented Dec. 28, 1897.
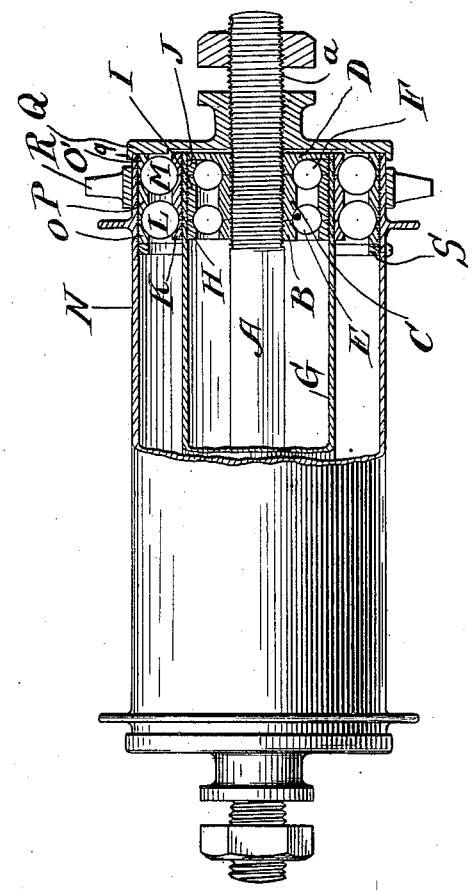
Witnesses:
Charles C. Burnap
Julia A. Burnap
Inventor:
John P. Thomas
By Offield, Towle & Linthicum,
Att'ys

UNITED STATES PATENT OFFICE.

JOHN P. THOMAS, OF CHICAGO, ILLINOIS.

BALL-BEARING.

SPECIFICATION forming part of Letters Patent No. 596,310, dated December 28, 1897.

Application filed March 24, 1897. Serial No. 628,946. (No model.)

*To all whom it may concern:*

Be it known that I, JOHN P. THOMAS, of Chicago, Illinois, have invented certain new and useful Improvements in Ball-Bearings, of which the following is a specification.

My invention relates to an improvement in ball-bearings, and is applicable to vehicle-axles as well as to bearings for shafts, revolving cylinders, &c.

I have shown my invention as applied to a shaft or axle bearing such as would be adapted for use on the rear wheel of a bicycle.

The drawing is a broken elevation, partly in section.

In said drawing let A represent the axle, which is threaded at its ends, the threads being marked a. Upon said threaded ends are turned the rings B C and the flanged cap D, which provide circular ways for the inner set of balls E F. These balls are arranged in circumferential series and are separated from each other.

G represents a barrel or cylinder threaded both internally and externally at its ends, and into this cylinder are screwed the bearing-rings H, I, and J, having internal grooves to form the outer circular raceways for the balls E F. The sleeve-bearing K, having two circumferential grooves or raceways for the balls L M, is screwed over the end of the cylinder or barrel G.

N represents the outer cylinder, internally threaded at its ends, in which the outer bearing-rings O, O', and P are turned.

Q represents end caps having threaded hubs engaging the threads of the axle and provided with the flanges q, fitting over the ends of the cylinder N.

R represents a sprocket-wheel which may be secured to the outer cylinder.

If in the construction above described power is applied to the sprocket-wheel R, rotary motion would be imparted to the outer cylinder, whose bearings are the outer series of balls L M. Said balls will travel in their circular raceway intermediate the two cylinders and in the same direction as the rotation of the outer cylinder and will impart a rotary motion to the inner cylinder in the same direction, but at a different rate of speed. The inner cylinder has its bearings on the inner series of balls, which travel in their raceways, which are secured to the axle.

The construction hereinabove described has numerous advantages. Its several parts are simple, requiring no expensive tools for the manufacture of its several parts, and said parts are readily fitted to and disconnected from each other. The employment of two series of balls concentrically arranged distributes the friction, and the employment of duplicate sets of ball-bearings at each end, separated from each other laterally, reduces the tendency to unsteadiness of movement, avoids binding, and obviates the necessity for the extremely-accurate fitting essential to a bearing wherein a single set of balls is employed.

I have shown a stop-ring S, forming an abutment for the bearing-rings O P, and it is obvious that by the employment of similar rings secured to the cylinder G the threading of the cylinders may be dispensed with, as such stop-rings, in connection with the threaded caps Q, will hold the bearing-rings in place.

The size of the parts and the number of sets of balls used may be varied, and my invention, as before stated, may be applied to various uses.

While I have designated my invention as being for an improvement in ball-bearings, it is obvious that it is clearly applicable to roll or cylinder bearings.

In the actual construction also suitable provision will be made for lubricating the parts.

I claim—

The combination, with a shaft or axle, of an integral inner cylinder surrounding said axle, an outer cylinder surrounding the inner cylinder and axle, said cylinders extending the length of the bearing and said three parts being concentric and having independent relative motion, divided bearings interposed between said three parts at each end of said axle, and provided with grooves forming raceways arranged in two parallel planes perpendicular to the axis of revolution at each end of the bearing, balls arranged in said grooves, and caps applied to the axle and overlapping the ends of the outer cylinder, substantially as described.

JOHN P. THOMAS.

Witnesses:
FREDERICK C. GOODWIN,
A. J. PRATT.